(12) United States Patent
Jaw

(10) Patent No.: US 6,720,062 B2
(45) Date of Patent: Apr. 13, 2004

(54) GRIP STRUCTURE FOR RACKET OR THE LIKE

(76) Inventor: Hunter Jaw, No. 32, Section 4, Sha Tien Road, Lung Ching Hsiang (TW)

( * ) Notice: Subject to any disclaimer, the term of this patent is extended or adjusted under 35 U.S.C. 154(b) by 113 days.

(21) Appl. No.: 09/884,976

(22) Filed: Jun. 21, 2001

(65) Prior Publication Data

US 2002/0197447 A1 Dec. 26, 2002

(51) Int. Cl.$^7$ ............................ B32B 27/14; B32B 3/00; B32B 5/26
(52) U.S. Cl. .................... 428/195.1; 428/198; 428/201; 442/381
(58) Field of Search .................... 428/103, 195

(56) References Cited

U.S. PATENT DOCUMENTS

| | | | | |
|---|---|---|---|---|
| 3,838,694 A | * | 10/1974 | Mesek | 128/287 |
| 5,543,206 A | * | 8/1996 | Austin et al. | 428/198 |
| 5,578,369 A | * | 11/1996 | Nohr et al. | 428/247 |
| 5,874,157 A | * | 2/1999 | Robinson et al. | 428/194 |

* cited by examiner

Primary Examiner—Arti Singh
Assistant Examiner—Christopher Pratt
(74) Attorney, Agent, or Firm—Alan D. Kamrath

(57) ABSTRACT

A grip structure includes a surface material layer, a substrate material layer, the surface material layer and the substrate material layer laminated with each other, and a plurality of evenly distributed bonding combination points secured between the surface material layer and the substrate material layer, so that the surface material layer can be bonded and combined with the substrate material layer by the bonding combination points. In such a manner, the sweat or water will return to infiltrate into the surface of the grip structure in a slower speed, thereby greatly enhancing the comfortable sensation of holding the grip structure of the racket.

5 Claims, 3 Drawing Sheets

GRIP STRUCTURE FOR RACKET OR THE LIKE

BACKGROUND OF THE INVENTION

1. Field of the Invention

The present invention relates to a grip structure for a racket or the like, and more particularly to a grip structure including a surface material layer, and a substrate material layer which are securely laminated and combined with each other by a plurality of evenly distributed bonding combination points.

2. Description of the Related Art

In general, the handgrip of a racket or the like is wound with a grip made of soft material to provide a buffer action to the handgrip of the racket, thereby reducing the vibration or impact applied on the handgrip of the racket.

A conventional grip in accordance with the prior art shown in FIG. 1 is a strip of a soft strap 1 consisting of a surface material layer 2 made of PU material, and a substrate material layer 3 made of non-woven fabric which are laminated with each other. In fabrication, the substrate material layer 3 is immersed into a PU solution, or the surface of the substrate material layer 3 is coated with a PU solution, so that the PU solution is attached on the substrate material layer 3. Then, the substrate material layer 3 is immersed and dipped into a water tank to cool the PU solution, thereby forming the surface material layer 2. At this time, the surface material layer 2 and the substrate material layer 3 are saturated with water so as to expand. Thus, the strap 1 has to be dried.

The surface material layer 2 and the substrate material layer 3 are made of different materials having different water contents, so that when the strap 1 is dried, the surface material layer 2 and the substrate material layer 3 need different periods of drying time. In addition, the surface material layer 2 and the substrate material layer 3 have different contracting rates during the drying process. Thus, the combination of the surface material layer 2 and the substrate material layer 3 is not rigid and not stable, so that the surface material layer 2 and the substrate material layer 3 are easily separated or stripped from each other during long-term utilization. Further, the weight of the product of the strap 1 is affected by factors of thickness, water contents etc. of the surface material layer 2 after being dried, so that the manufacturer cannot estimate and control the weight of the strap product accurately, thereby greatly affecting the quality of the conventional grip.

SUMMARY OF THE INVENTION

The present invention has arisen to mitigate and/or obviate the disadvantage of the conventional grip for a racket.

The primary objective of the present invention is to provide a grip structure including a surface material layer, and a substrate material layer which are securely laminated and combined with each other by a plurality of evenly distributed bonding combination points so that the surface material layer and the substrate material layer are not separated or stripped from each other easily, thereby forming a rigid grip structure. In such a manner, the weight of the grip structure can be controlled easily.

Another objective of the present invention is to provide a grip structure, wherein the plurality of bonding combination points between the surface material layer and the substrate material layer form an obstruction layer, so that when the grip structure absorbs water, the water will not easily infiltrate back into the surface material layer, thereby increasing the permeable effect of the grip structure.

In accordance with the present invention, there is provided a grip structure comprising:

a surface material layer;

a substrate material layer, the surface material layer and the substrate material layer laminated with each other; and a plurality of evenly distributed bonding combination points secured between the surface material layer and the substrate material layer, so that the surface material layer can be bonded and combined with the substrate material layer by the bonding combination points.

By such arrangement, the sweat or water will return to infiltrate into the surface of the grip structure in a slower speed, thereby greatly enhancing the comfortable sensation of holding the grip structure of the racket.

Further benefits and advantages of the present invention will become apparent after a careful reading of the detailed description with appropriate reference to the accompanying drawings.

DETAILED DESCRIPTION OF THE INVENTION

Figure 1:
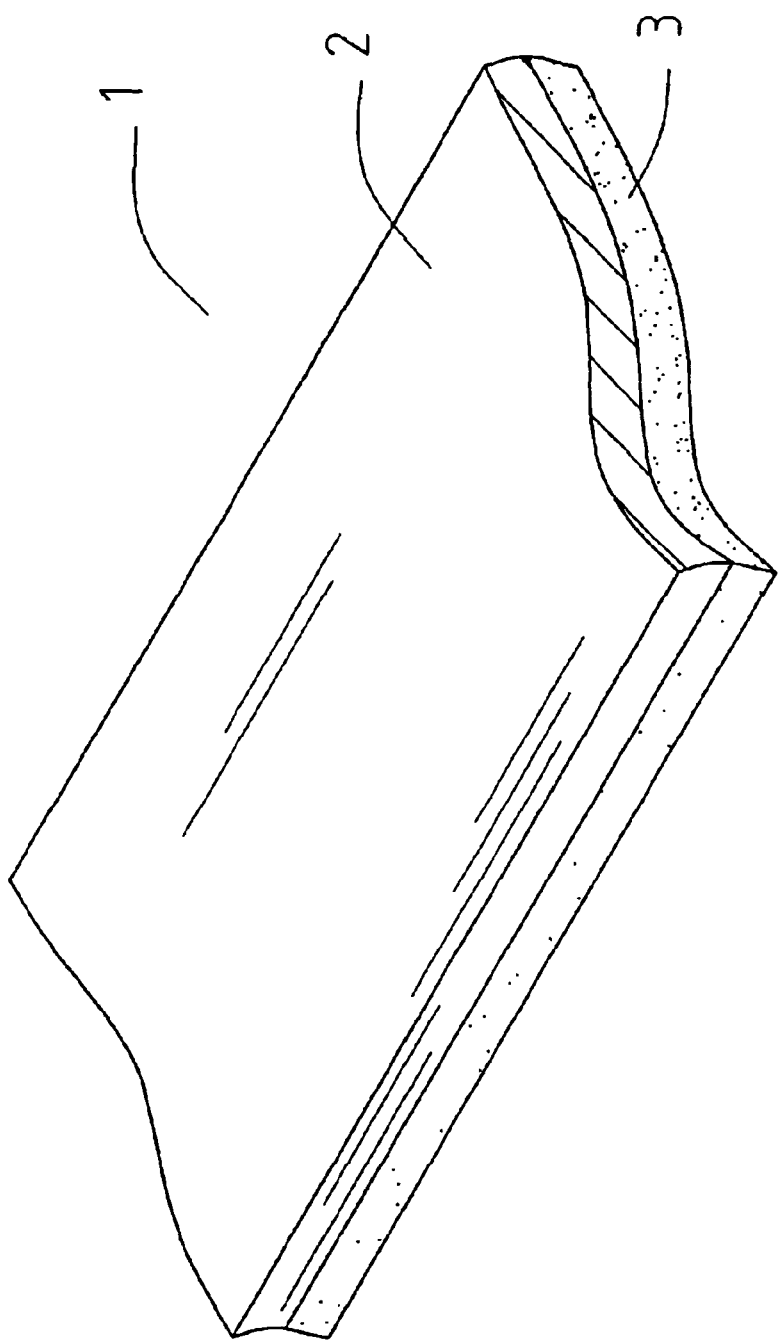
FIG. 1 is a perspective view of a conventional grip for a racket in accordance with the prior art.
Figure 2:
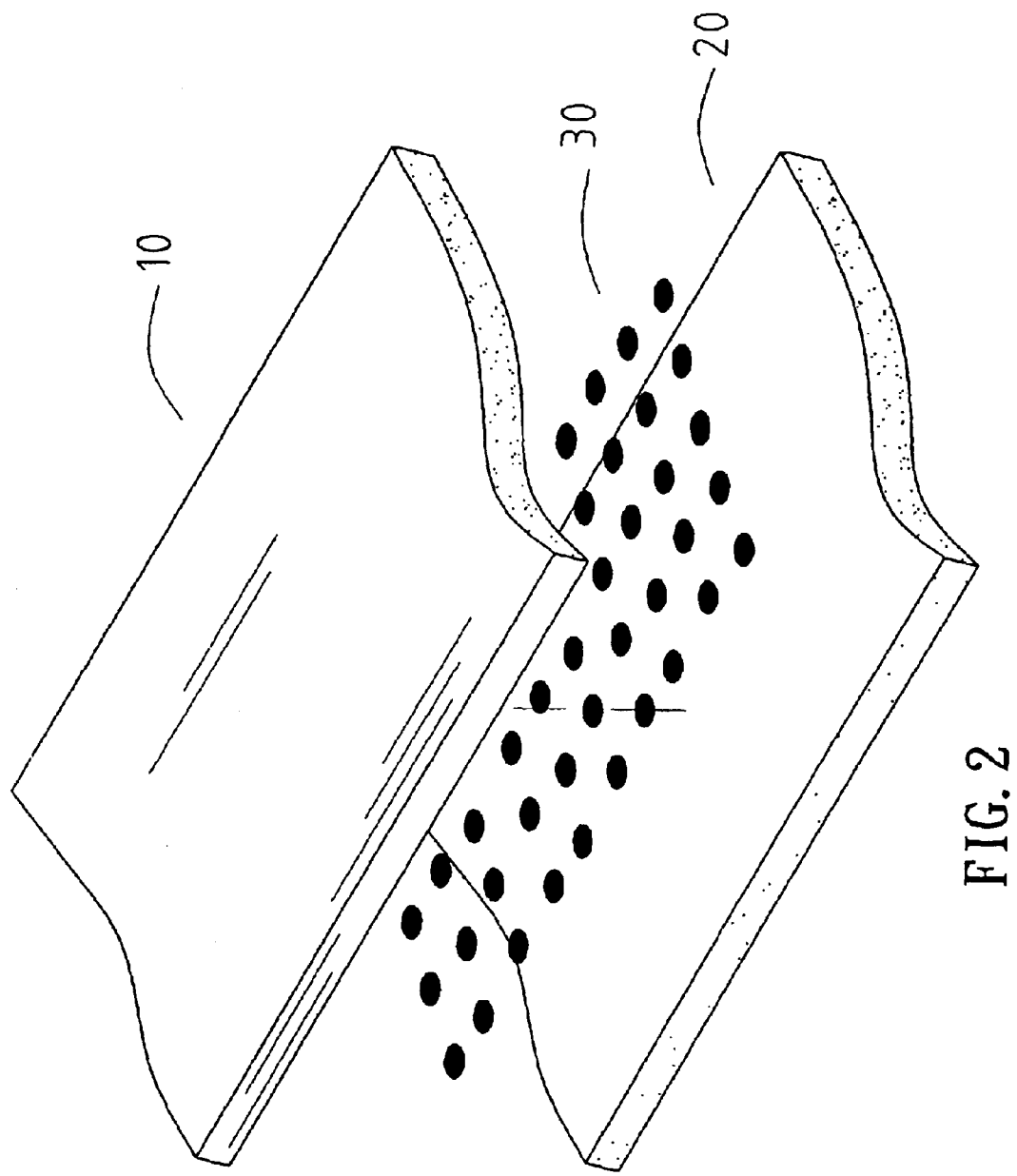
FIG. 2 is an exploded perspective view of a grip structure for a racket in accordance with the present invention.
Figure 3:
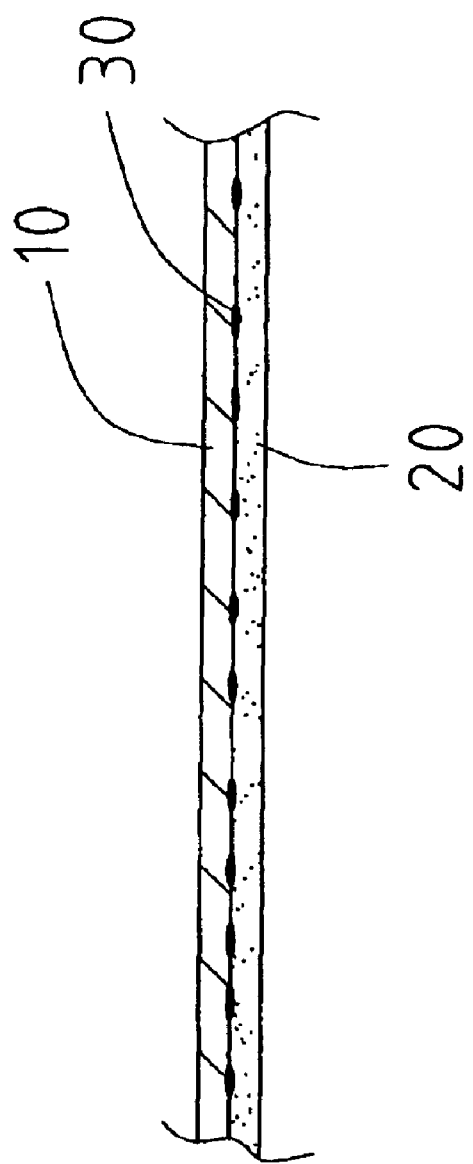
FIG. 3 is a partially cut-away front plan cross-sectional assembly view of the grip structure as shown in FIG. 2.

Referring to FIGS. 2 and 3, a grip structure for a racket or the like in accordance with the present invention comprises a surface material layer 10, and a substrate material layer 20, wherein the surface material layer 10 and the substrate material layer 20 are serially laminated with each other. A plurality of evenly distributed bonding combination points 30 are secured between the surface material layer 10 and the substrate material layer 20. Preferably, each of the bonding combination points 30 is an adhesive agent such as a heat melted gel, so that the surface material layer 10 can be bonded and combined with the substrate material layer 20 by the bonding combination points 30.

In fabrication, the surface material layer 10 and the substrate material layer 20 are pre-fabricated, and the bonding combination points 30 are secured on the top face of the substrate material layer 20. Then, the surface material layer 10 that has been formed by prefabrication is coated on the top face of the substrate material layer 20. The bonding combination points 30 are flattened during a heat press process, for bonding and combining the surface material layer 10 and the substrate material layer 20, thereby manufacturing the product of the grip structure. The surface material layer 10 and the substrate material layer 20 are pre-fabricated, so that the weight can be controlled accurately. In addition, the surface material layer 10 and the substrate material layer 20 need not to be dipped and immersed in the water liquid and to be dried, so that the surface material layer 10 and the substrate material layer 20 are not deformed by expansion and contraction due to the temperature effect, thereby enhancing the effect of combination, so that the surface material layer 10 and the substrate material layer 20 are not stripped easily.

Further, when the user's hand sweat is produced, the water molecule passes through the periphery of each of the bonding combination points 30 to infiltrate into the substrate material layer 20 gradually. When the sportsman exerts a greater holding force to hold the handgrip of the racket, the water contained in the pressure bearing region that is subjected to pressure of the hand will diffuse or expand toward the peripheral portion, thereby decreasing the humidity. At this time, by obstruction of the bonding combination points 30, the water contained in the substrate material layer 20 cannot return to infiltrate the surface material layer 10 immediately. When the holding force is reduced, the pressure bearing region has a smaller humidity, so that the water contained in the peripheral portion will return to infiltrate into the pressure bearing region. At this time, by obstruction of the bonding combination points 30, water contained in the substrate material layer 20 cannot return to infiltrate into the pressure bearing region immediately. Thus, the humidity contained in the pressure bearing region will not lift rapidly, such that under the holding pressure, the sweat or water will return to infiltrate into the surface of the grip in a slower speed than that of the conventional grip structure, thereby greatly enhancing the comfortable sensation of holding the grip of the racket.

In addition, the surface material layer 10 may be drilled with bores or formed with recesses (not shown in the figures), so that the hand sweat can infiltrate into the substrate material layer 20, thereby greatly enhancing the comfortable sensation of holding the grip of the racket.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A grip structure for a racket comprising:
   a surface material layer formed of PU material and having a flat surface;
   a substrate material layer formed of fabric and having a flat surface, said surface material layer and said substrate material layer laminated with each other; and
   a plurality of evenly distributed bonding combination points secured between said flat surface of said surface material layer and said flat surface of said substrate material layer bonding and combining said flat surface of said surface material layer and said flat surface of said substrate material layer, with the bonding combination points obstructing the immediate infiltration of water contained in the substrate material layer into the surface material layer when subjected to pressure.

2. The grip structure of claim 1 with the fabric being non-woven.

3. The grip structure of claim 1 with the bonding combination points being an adhesive agent.

4. The grip structure of claim 3 with the adhesive agent being a heat melted gel.

5. The grip structure of claim 4 with the fabric being non-woven.

* * * * *